(12) United States Patent
Huegerich et al.

(10) Patent No.: US 6,707,015 B2
(45) Date of Patent: Mar. 16, 2004

(54) HEATING CONTROL SYSTEM FOR A ROLLER GRILL

(75) Inventors: Michael L. Huegerich, St. Louis, MO (US); Timothy Gaskill, Edwardsville, IL (US)

(73) Assignee: Star Manufacturing International, Inc., St. Louis, MO (US)

( * ) Notice: Subject to any disclaimer, the term of this patent is extended or adjusted under 35 U.S.C. 154(b) by 0 days.

(21) Appl. No.: 10/406,536

(22) Filed: Apr. 3, 2003

(65) Prior Publication Data
US 2003/0197005 A1 Oct. 23, 2003

Related U.S. Application Data
(60) Provisional application No. 60/373,894, filed on Apr. 19, 2002.

(51) Int. Cl.$^7$ .................................................. A23L 1/00
(52) U.S. Cl. ......................................... 219/494; 219/400
(58) Field of Search ..................... 219/388, 400–412, 219/497, 483, 486, 501, 506, 499, 494; 99/326, 386, 443 C, 341, 395, 443 R, 444

(56) References Cited

U.S. PATENT DOCUMENTS

| | | | |
|---|---|---|---|
| 3,590,725 A | 7/1971 | Bilynsky | 99/334 |
| 3,854,392 A | 12/1974 | Eason | 99/421 |
| 4,370,920 A * | 2/1983 | Henriques et al. | 99/339 |
| 4,380,192 A | 4/1983 | Doren | 99/441 |
| 4,612,684 A | 9/1986 | Kollross | 17/45 |
| 4,723,482 A | 2/1988 | Weiss et al. | 99/441 |
| 4,913,047 A | 4/1990 | Burley | 99/441 |
| 5,117,748 A | 6/1992 | Costa | 99/441 |
| 5,211,106 A | 5/1993 | Lucke | 99/441 |
| 5,458,051 A * | 10/1995 | Alden et al. | 99/349 |
| 6,045,848 A | 4/2000 | Quinones et al. | 426/513 |
| 6,101,927 A | 8/2000 | Kurmlavage | 99/343 |
| 6,152,531 A | 11/2000 | Deceuninck | 297/284.4 |
| 6,157,002 A * | 12/2000 | Schjerven, Sr. et al. | 219/388 |
| 6,283,846 B1 | 9/2001 | Townsend | 452/27 |
| 6,354,193 B1 | 3/2002 | Lee | 99/334 |
| 6,393,971 B1 * | 5/2002 | Hunot | 99/341 |
| 2002/0005120 A1 | 1/2002 | Kurmlavage | 99/342 |

FOREIGN PATENT DOCUMENTS

| | | | |
|---|---|---|---|
| EP | 0 168 985 A1 | 1/1986 | A47J/37/04 |
| EP | 0 528 575 A1 | 2/1993 | A22C/11/00 |
| EP | 0 364 684 B1 | 4/1993 | A47J/27/212 |
| EP | 0424675 B1 | 8/1993 | A22C/15/00 |
| EP | 0 777 992 B1 | 9/1998 | A47J/37/04 |
| WO | WO 00/71010 A1 | 11/2000 | A47J/37/12 |

* cited by examiner

Primary Examiner—Mark Paschall
(74) Attorney, Agent, or Firm—H. Frederick Rusche, Esq.; Dutro E. Campbell, Esq.; Husch & Eppenberger, LLC

(57) ABSTRACT

A heating control system in a roller grill has means for setting a set temperature, at least one temperature sensor mounted in the region of the rollers to measure the temperature of the area surrounding the food being heated on the grill, a temperature display in communication with the temperature sensor that indicates the temperature of the food area, and a control device that monitors the temperature measured in the area of the rollers and food and adjusts the input to heating elements to minimize variation of the measured temperature from the set temperature. Another embodiment of the system includes an offset heating structure in at least one roller to allow a temperature offset between two sides of the roller; and means for adjusting the temperature offset between the two sides of the roller.

35 Claims, 5 Drawing Sheets

HEATING CONTROL SYSTEM FOR A ROLLER GRILL

CROSS-REFERENCES

This application claims the priority of provisional application Serial No. 60/373,894, filed Apr. 19, 2002.

TECHNICAL FIELD OF THE INVENTION

The present invention relates generally to assemblies for cooking human food and, more particularly, to an assembly having heated rollers mounted in a grill housing and having a heating control system.

BACKGROUND OF THE INVENTION

Grills using heated rollers to cook certain food items with elongated shapes, such as hot dogs and sausages are commonly used in convenience stores, amusement parks and entertainment venues. These grills utilize a drive mechanism to rotate the rollers and, in turn, any food items placed on the rollers.

Prior art grills generally utilize what is referred to as an infinite control. Rather than functioning as a true temperature control, an infinite control varies the percentage of time that the heating elements in the rollers are on. The design of the infinite controls used on most prior art grills is very similar in design to the control knob for an electric range top. The control dial is typically marked with an arbitrary scale, i.e., from 1 to 10. Instead of indicating a particular temperature setting, these numbers represent an input to the heating elements. For example, a setting of 1 might refer to an input in which the heating elements are on 10% of the time, while a setting of 9 might refer to an input in which the heating elements are on 90% of the time. Other prior art grills use a three heat switch having low, medium, and high settings. These grills vary the heat delivered by the rollers by selectively turning the heating elements in certain rollers on or off.

The dial settings of the infinite controls used in the prior art do not directly correspond to the temperature of the food being cooked on the grill. Therefore, operators must depend on experimentation and testing to determine the appropriate infinite control setting for a desired food temperature rather than simply relying on the control setting itself. In addition, since most infinite controls can vary the heating element input from 1% to 100% and the input level has no direct relationship to the actual food temperature, an inexperienced operator may set the control at an input level that is too low, resulting in an unsafe food temperature.

Environmental factors often compound this problem. Because the output of an infinite control remains constant and is not directly related to the temperature of the food being prepared, changes in the environmental conditions surrounding the grill will affect the temperature of the food. For example, when used at an outdoor sports stadium, the same prior art roller grill will require one setting on a warm day in August and a completely different setting on a colder day in November.

In addition, prior art roller grills are limited to separate heating zones at the front and rear of the grill, with no means to vary heating from one side of the grill to the other. This limits the number of heating zones on the grill and, therefore, functionally limits the different food offerings an operator may prepare on a single grill. Due to the current trend for a more diverse product offering on roller grills, this represents a serious limitation of the prior art grills.

The present invention is directed to overcoming one or more of the problems set forth above.

SUMMARY OF THE INVENTION

An aspect of the present invention is to provide a roller grill with a control system that allows the operator to more directly control the temperature of the food being prepared on the grill.

Another aspect of the present invention is to provide a roller grill with a larger number of separate heating areas that allow different foods to be heated to different temperatures at the same time.

In accordance with the above aspects of the invention, there is provided a roller grill having means for setting a set temperature, at least one temperature sensor mounted in the region of the rollers to measure the temperature of the area surrounding the food being heated on the grill, a temperature display that indicates the temperature of the food area, and a control device that monitors the temperature measured in the area of the rollers and food and adjusts the input to the heating elements to minimize variation of the measured temperature from the set temperature.

In another embodiment, the range from which an operator can select a set temperature is limited from about 140° F. to about 170° F.

In yet another embodiment, the roller grill also includes a preheat switch that raises the temperature of the grill for a set amount of time to quickly heat the food before serving.

In a further embodiment, the rollers of the grill are provided an offset heating structure in at least one roller, to allow a temperature offset between two sides of the roller, and means for adjusting the temperature offset between the two sides of the roller.

These aspects are merely illustrative aspects of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
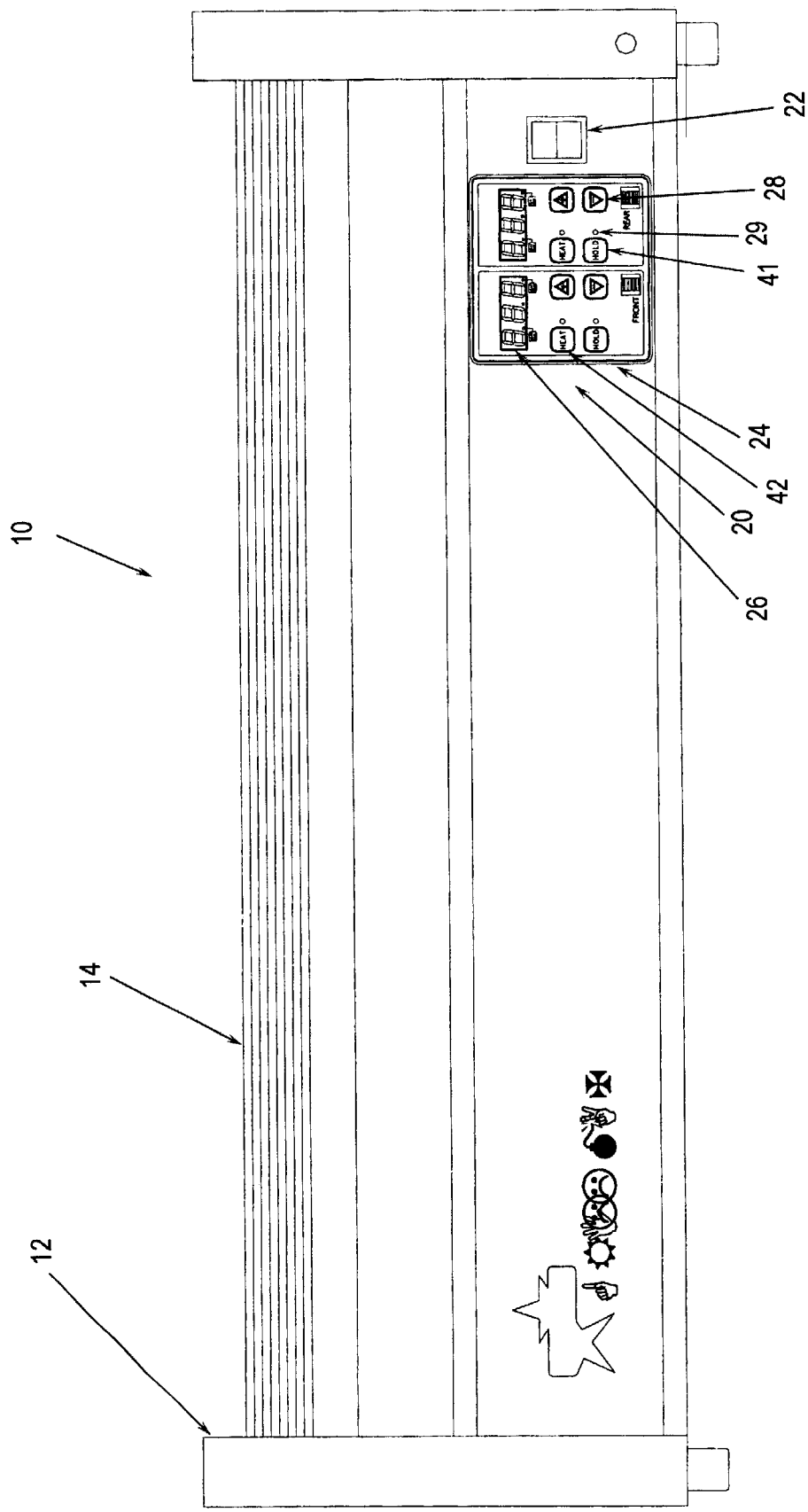
FIG. 1 is a front view of a roller grill incorporating a heating control system according to an embodiment of the present invention.

FIG. 1 illustrates a roller grill 10 with a heating control system. The grill 10 is composed primarily of a frame 12, a plurality of rollers 14, and a sneeze guard (not shown). The frame 12 houses a drive mechanism for the rollers (not shown) and a heating control system, which will be described in more detail below. Roller 14 contains at least one heating element 18, which can be seen in more detail in FIG. 5. The figures illustrate embodiments of a roller grill in which each roller is provided with a heating element, but alternate embodiments in which only some of the rollers are provided with heating elements are also consistent with the claimed invention.

An operator panel 20 is mounted in the front region of the frame 12. The operator panel 20 contains a power switch 22 and a temperature control panel 24 for at least one heating section. The embodiment shown in FIG. 1 shows a roller grill having two temperature control panels 24, one each for two separate heating sections. Each temperature control panel 24 contains a display 26 and temperature setting means 28. In a particularly preferred embodiment, the display 26 is a three digit, seven segment with decimal point LED display. The display 26 has at least two modes: one mode indicates the preprogrammed temperature or temperature selected by the operator and another mode indicates the temperature measured by sensors 30. The mode in which the measured temperature is displayed is referred to as the service mode. In one embodiment, switching the display to the service mode requires entry of a code so that access to the service mode is limited. In other embodiments, the display has additional modes to display a preheat temperature and time to reach preheat temperature, which are explained in more detail below. In the embodiment shown in FIG. 1, the temperature setting means 28 includes an adjustment mechanism having two buttons, one of which allows the operator to increase the temperature while the other decreases the temperature. Other suitable temperature setting means 28 include, but are not limited to, dials, rocker switches, or numerical keypads. The temperature setting means 28 may also be limited to a fixed temperature setting. Other embodiments of the temperature control panels 24 include LED indicators 29 and an audible alarm.

The display 26 and temperature setting means 28 may have yet another mode in which an operator can select a temperature calibration factor. The temperature calibration factor is a programmed differential between the set temperature and the actual measured temperature. The grill can be subject to variations in temperature across the grilling area. Due to the positioning of the temperature sensors 30 (as discussed below) the actual grill temperature at a point spaced from the sensors may differ slightly from the measured temperature indicated by the sensors 30. In such an instance, the actual grill temperature may be equivalent to the set temperature even though the measured temperature indicated by the sensors 30 is not. Selecting a temperature calibration factor provides control of any such variation. The temperature calibration factor is generally a factory setting.

Figure 2:
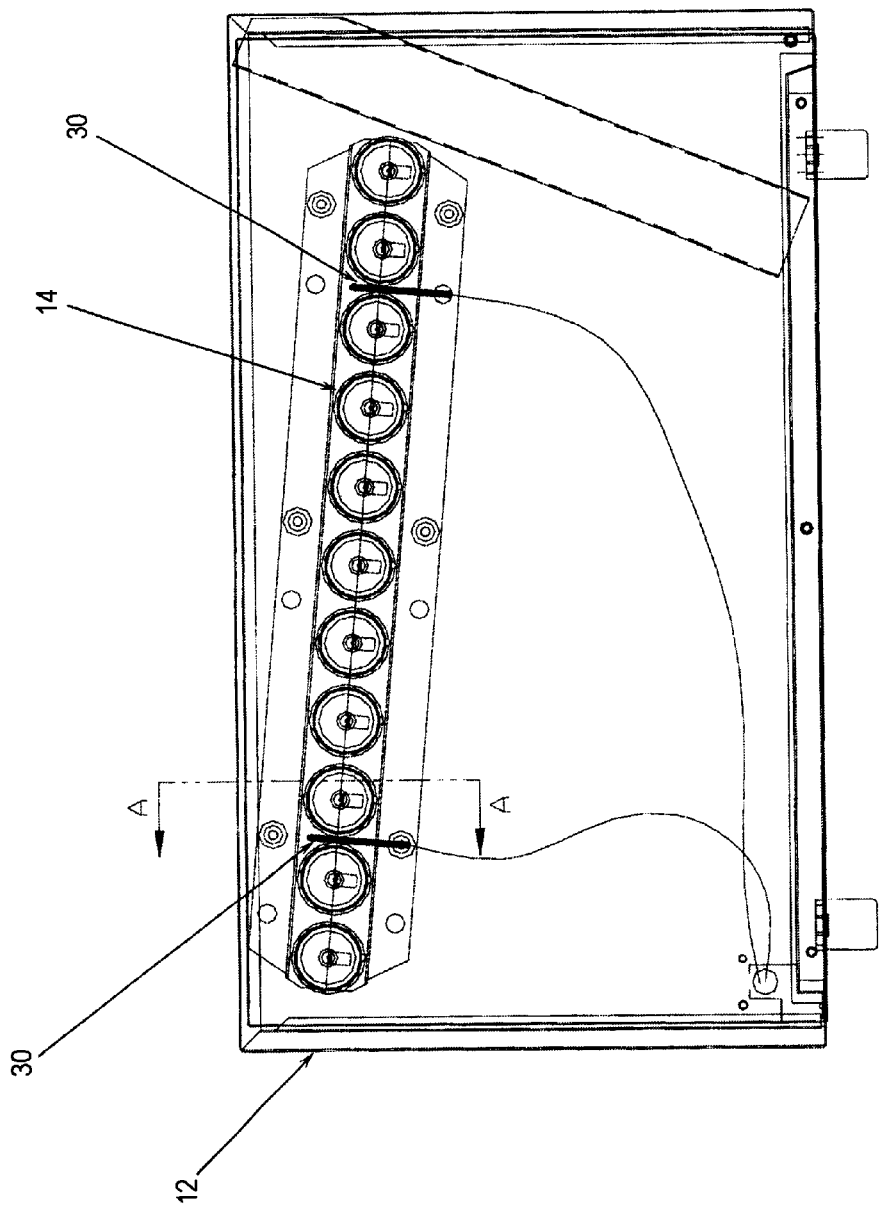
FIG. 2 is a side view of a roller grill incorporating a heating control system having temperature sensors according to an embodiment of the present invention.
Figure 3:
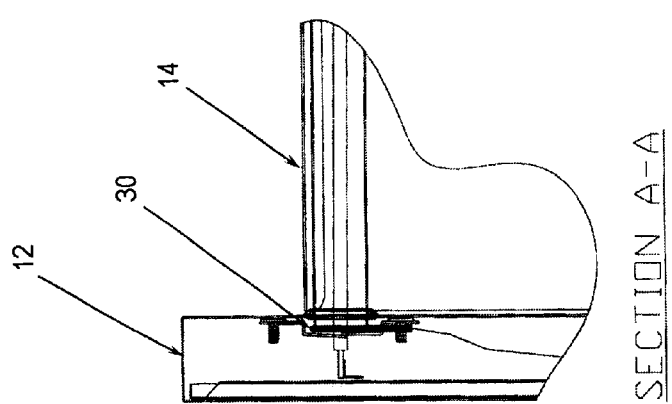
FIG. 3 is a section view taken along the line A—A in FIG. 2.

FIG. 2 shows the temperature sensing portion of the system. In the embodiment shown, two sensors 30 are mounted at one side of the frame 12 at the area of the rollers 14. In a preferred embodiment, the sensors 30 are thermistors encased in stainless steel. This particular embodiment shows the sensors 30 mounted between the ends of the second and third rollers 14 from both the front and back of the grill 10. This arrangement is advantageous in those embodiments in which the front and back of the grill 10 are separated into independent heating sections. The sensors 30 are positioned such that they are able to measure the temperature of the area immediately surrounding the rollers 14, which includes the area in which any food items on the grill 10 are located. This positioning allows the sensors 30 to provide a close approximation of the temperature of the food. FIG. 3 provides another view of how the sensors 30 are mounted in this embodiment.

Figure 4:
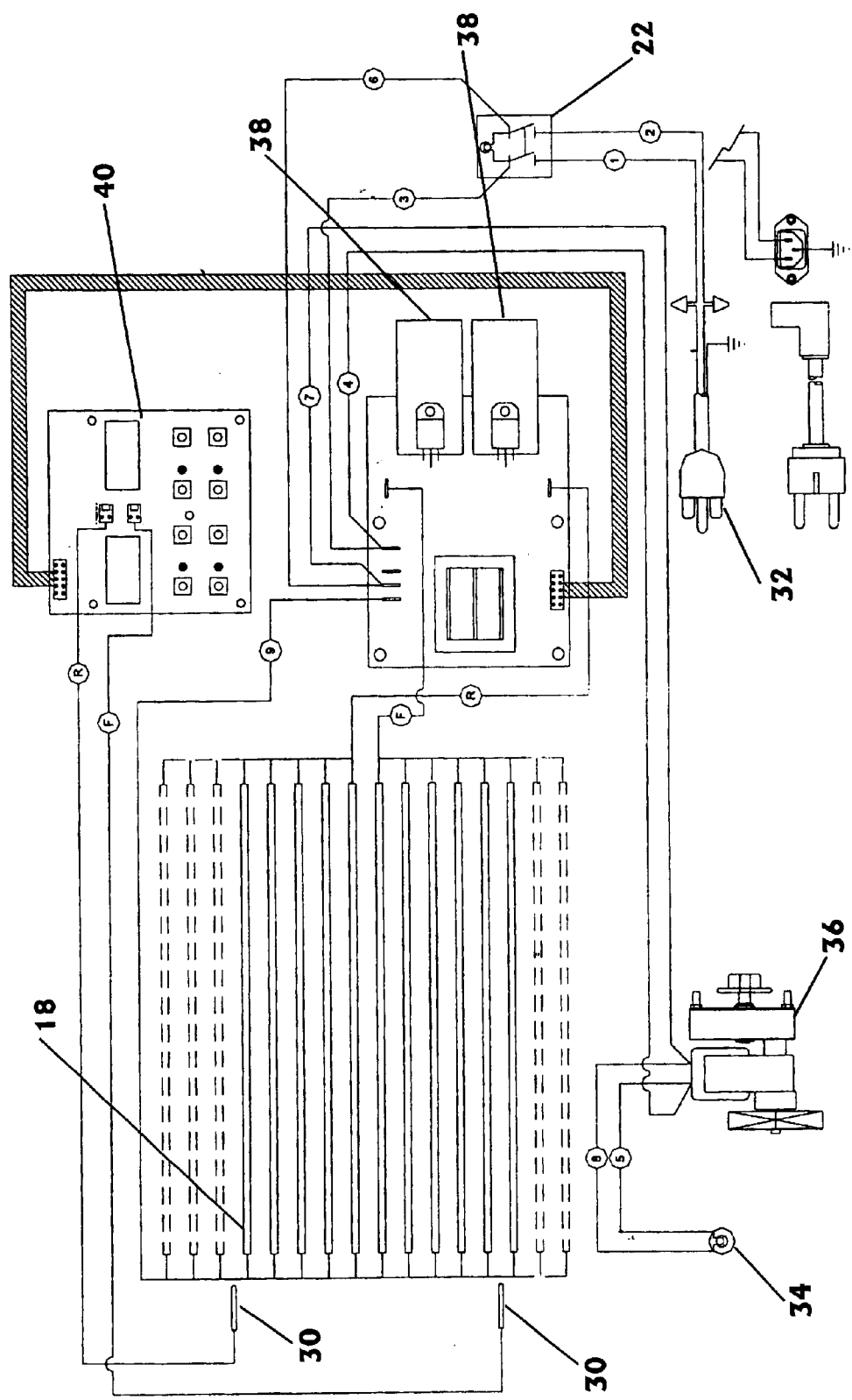
FIG. 4 is a schematic diagram illustrating the components of a heating control system in a roller grill according to an embodiment of the present invention.

FIG. 4 provides a schematic diagram of the components of the heating control system. A power cord 32 connects the grill 10 to a standard electrical wall outlet. The power switch 22 turns the unit on and off and controls the flow of electricity to the remaining elements of the system. A light 34 indicates when the power switch 22 is in the on or off position. A motor 36 powers a drive mechanism (not shown in more detail), which turns the rollers 14. A relay 38 communicates with and adjusts the operation of the heating elements 18 associated with a particular heating section. There is one relay 38 for each heating section. A control device 40 communicates with the temperature control panels 24, sensors 30 and the relays 38. In a preferred embodiment, the control device 40 is a microprocessor.

In operation, an operator selects a set temperature for a heating section by manipulating the temperature setting means 28 until the display 26 shows the set temperature. Alternatively, the operator may simply turn on the temperature setting means 28 if the set temperature is fixed. The temperature setting means 28 transmits the set temperature to the control device 40 as a signal or series of signals. The control device 40 compares the signal from the temperature setting means 28 with a signal sent by the sensor 30 for the relevant heating section, which indicates the temperature at the rollers 14 in that heating section. If a temperature calibration factor has been programmed into the unit, the control device 40 adjusts the signal sent by the sensor 30 based on the temperature calibration factor before comparing that signal with the signal from the temperature setting means 28. The control device 40 then transmits a signal to the relay 38 that controls the heating elements 18 in the rollers 14 of that heating section directing the relay 38 to turn the heating elements 18 on or off as needed to reach the set temperature. Subsequently, the control device 40 continues to monitor the signal from the sensor 30, compare that signal to the signal sent by the temperature setting means 28, and transmit a signal to the relay 38 whenever the heating elements 18 in the heating section should be turned on or off to maintain the set temperature.

In another embodiment, the set temperature can be programmed into the memory of the control device 40 so that the control device 40 automatically heats the grill 10 to the programmed set temperature when the power switch 22 is turned on. This embodiment is provided with a button 41 to initiate programming of the set temperature. In yet another embodiment, the audible alarm is activated when the set temperature is reached to notify the operator.

In one embodiment, the control device 40 is provided with upper and lower limits on the range of temperatures that it will maintain regardless of the set temperature selected by the operator. In an advantageous embodiment, the temperature setting means 28 and display 26 are provided with the same limits as the control device 40 and will not allow an operator to enter a set temperature outside of those limits. In one particularly advantageous embodiment, a lower temperature limit of about 140° F. and an upper temperature limit of about 170° F. are used.

In another embodiment, the temperature control panel 24 includes a preheat switch 42. The preheat switch 42 communicates with the control device 40. When an operator activates the preheat switch 42, it sends a signal to the control device 40. The control device 40 then raises the temperature of the grill 10 for a set amount of time (the preheat cycle time) to quickly heat food (for example, frozen hot dogs) placed on the grill 10 before serving. The control device sends a signal to the relays 38 to turn on and leave on the heating elements 18 until a particular temperature is measured by the sensors 30. The rate at which the control device 40 raises the heat at the rollers 14 can be adjusted by changing the preheat temperature and the preheat cycle time. This capability is advantageous because it prevents the grill 10 from becoming too hot, which can damage certain foods, such as the casings of hot dogs. However, if the heating grill temperature is kept relatively low, the normal amount of time required to heat the rollers will be sufficiently long enough to prevent damage to the food without the need to manually adjust the time to reach the preheat temperature. In one embodiment, both the preheat temperature and the preheat cycle time may be programmed into the memory of the control device 40. In another embodiment, the control device 40 rapidly increases the heat of the grill 10 initially and then allows the temperature of the grill to decrease to a lower setting.

Figure 5:
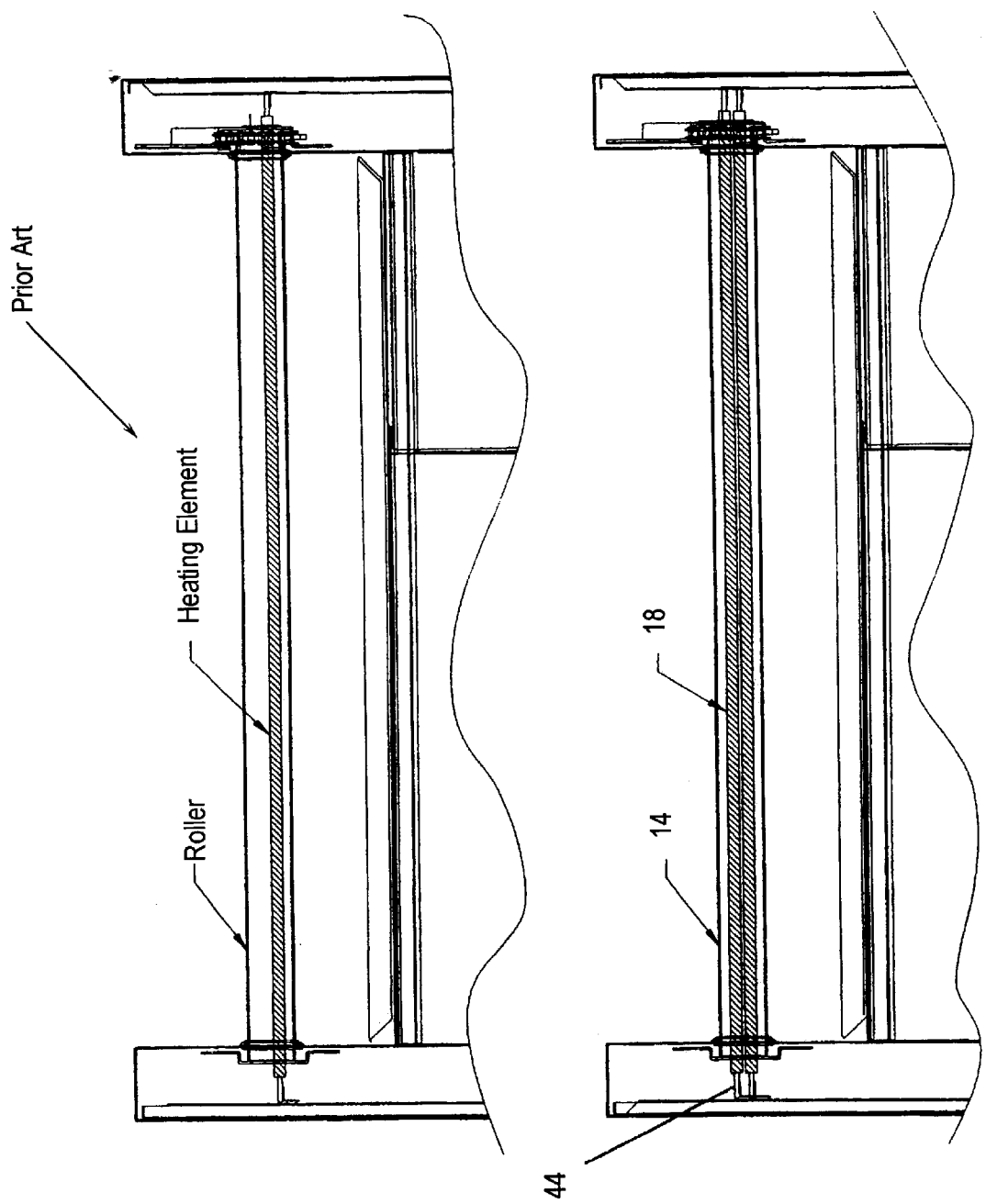
FIG. 5 is a split schematic diagram showing the rollers of a prior art grill on top and showing rollers incorporating a heating control system having independent left and right heating sections according to an embodiment of the present invention on bottom.
Figure 6:
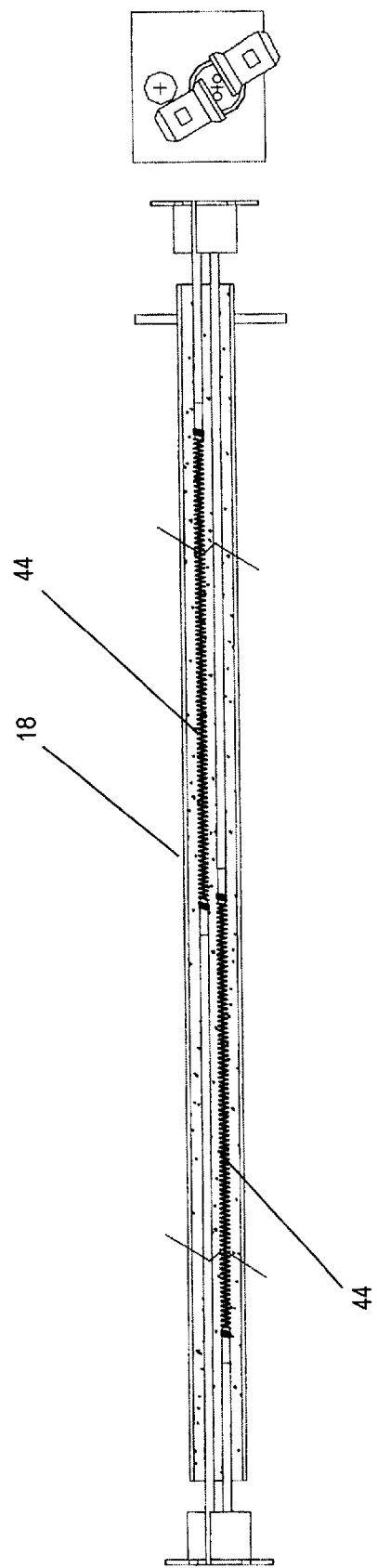
FIG. 6 is a schematic diagram showing rollers incorporating a heating control system having independent left and right heating sections according to another embodiment.

A schematic of a prior art roller grill is shown in the top half of FIG. 5. As is readily apparent, each roller in the prior art roller grill contains a single heating element. Each of the heating elements in the prior art grill has a resistance wire extending along the entire length of the heating element, distributing heat relatively evenly along the length of the roller. The lower half of FIG. 5 illustrates an embodiment of a roller grill 10 according to the present invention. The grill 10 is provided with rollers 14 that each have two heating elements 18 running therethrough. In contrast to the prior art, heating elements 18 contain a resistance wire 44 extending along only a portion of the length of the heating element 18. In each roller, opposite halves of each heating element contain a resistance wire. This arrangement allows the temperature of the left and right sides of the rollers 14 to be offset. The temperature offset is adjustable. The temperature offset allows each front and rear heating section to be further divided into separate left and right heating sections, allowing the operator to provide a more diverse product offering on a single grill. This side-to-side grill temperature offset may also be achieved by using a single heating element 18 in each roller 14 as shown in FIG. 6. Each heating element contains two resistance wires 44. One resistance wire 44 extends along a portion of one half of the heating element 18 while the second resistance wire 44 extends along a portion of the opposite half of the heating element 18, thereby allowing independent control of the two sides of the heating element.

The above described embodiments describe grills in which each roller is provided with a heating element. However, the claimed invention may also be utilized in alternate embodiments in which only some of the rollers contain heating elements.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. A grill for cooking food, including:
   a plurality of heated rollers forming a grilling area, said rollers being heated by at least one heating element;
   means for setting a set temperature for the grilling area;
   at least one temperature sensor mounted in the region of the rollers to measure the temperature of the grilling area; and
   a control device in communication with the means for setting, the temperature sensor, and the heating element, said control device monitoring the measured temperature, comparing the measured temperature with the set temperature, and adjusting the heating element to minimize variation of the measured temperature from the set temperature without involvement of an operator.

2. A grill for cooking food as set forth in claim 1, wherein the means for setting includes an adjustment mechanism by which the operator can select the set temperature for the grilling area.

3. A grill for cooking food as set forth in claim 2, wherein the adjustment mechanism allows an operator to select a temperature calibration factor and wherein the control device adjusts the measured temperature based on the temperature calibration factor prior to comparing the measured temperature with the set temperature.

4. A grill for cooking food as set forth in claim 1, wherein the means for setting is programmable and the set temperature is programmed into the means for setting.

5. A grill for cooking food as set forth in claim 1, wherein the control device is programmable and the set temperature is programmed into the control device by the means for setting.

6. A grill for cooking food as set forth in claim 1, further including a multifunction temperature display, which selectively indicates the measured temperature and the set temperature.

7. A grill for cooking food as set forth in claim 2, wherein the adjustment mechanism limits the range from which the operator can select the set temperature from about 140° F. to about 170° F.

8. A grill for cooking food as set forth in claim 1, further including a preheat switch that directs the control device to activate the heating element to raise the temperature of the grilling area to a preheat temperature for a set amount of time.

9. A grill for cooking food as set forth in claim 1, wherein at least one roller is provided with first and second heating elements, with each heating element having a resistance wire along only a portion of its length, said first and second heating elements being oriented so that the resistance wire of the first heating element is positioned on the opposite side of the roller from the resistance wire of the second heating element, thereby allowing the temperature to be offset between the two sides of the roller.

10. A grill for cooking food as set forth in claim 9, further including means for adjusting the temperature offset between the two sides of the roller.

11. A grill for cooking food as set forth in claim 1, wherein at least one roller is provided with a heating element having first and second halves and first and second resistance wires and wherein the first resistance wire extends along a portion of the first half of the heating element and the second resistance wire extends along a portion of the second half of the heating element, thereby allowing the temperature to be offset between the two sides of the roller.

12. A grill for cooking food as set forth in claim 11, further including means for adjusting the temperature offset between the two sides of the roller.

13. A grill for cooking food as set forth in claim 1, wherein the temperature sensor is a thermistor encased in stainless steel.

14. In a grill functionally separated into front and back sections with heating elements associated with the front and back sections controlled independently, a heating control system, including:
   means for independently setting a first set temperature for the front section and a second set temperature for the back section;
   a first temperature sensor to measure a first measured temperature of the front section and a second temperature sensor to measure a second measured temperature of the back section; and
   a control device in communication with the means for independently setting, the temperature sensors, and the heating elements, said control device monitoring the first and second measured temperatures, comparing the first and second measured temperatures with the first and second set temperatures, respectively, and independently adjusting the heating elements of the front and back sections to minimize variation of the first and second measured temperatures from the first and second set temperatures without involvement of an operator.

15. A heating control system for a grill as set forth in claim 14, wherein the means for independently setting includes an adjustment mechanism by which the operator can select at least one of the first and second set temperatures.

16. A heating system for a grill as set forth in claim 15, wherein the adjustment mechanism allows an operator to select a temperature calibration factor and wherein the control device adjusts at least one of the first and second measured temperatures based on the temperature calibration factor prior to comparing the measured temperature with the respective set temperature.

17. A heating system for a grill as set forth in claim 14, wherein the means for independently setting is programmable and at least one of the first and second set temperatures is programmed into the means for independently setting.

18. A grill for cooking food as set forth in claim 14, wherein the control device is programmable and at least one of the first and second set temperatures is programmed into the control device by the means for independently setting.

19. A heating control system for a grill as set forth in claim 14, further including a multi-function temperature display, which selectively indicates the measured temperatures and the set temperatures.

20. A heating control system for a grill as set forth in claim 15, wherein the adjustment mechanism limits the range from which an operator can select at least one of the first and second set temperatures from about 140° F. to about 170° F.

21. A heating control system for a grill as set forth in claim 14, further including a preheat switch that directs the control device to selectively activate the heating elements for at least one of the front and back sections to raise the temperature of the section to a preheat temperature for a set amount of time.

22. A heating control system for a grill as set forth in claim 14, wherein the grill includes at least one set of first and second heating elements, with the first and second heating elements each having a resistance wire along only a portion of its length, said first and second heating elements being oriented so that the resistance wire of the first heating element is positioned on the opposite side of the roller from the resistance wire of the second heating element, thereby allowing the temperature to be offset between the two sides of the set of heating elements.

23. A heating control system for a grill as set forth in claim 22, further including means for adjusting the temperature offset between the two sides of the set of heating elements.

24. A heating control system for a grill as set forth in claim 14, wherein the grill includes at least one heating element having first and second halves and provided with first and second resistance wires and wherein the first resistance wire extends along a portion of the first half of the heating element and the second resistance wire extends along a portion of the second half of the heating element, thereby allowing the temperature to be offset between the two halves of the heating element.

25. A heating control system for a grill as set forth in claim 24, further including means for adjusting the temperature offset between the two halves of the heating element.

26. A heating control system for a grill as set forth in claim 14, wherein at least one of the first and second temperature sensors is a thermistor encased in stainless steel.

27. A grill for cooking food, including:
   a plurality of rollers forming a grilling area;
   an offset heating structure in at least one roller to allow a temperature offset between two sides of the roller; and
   means for adjusting the temperature offset between the two sides of the roller.

28. A grill for cooking food as set forth in claim 27, wherein the offset heating structure includes:
   a heating element in the roller, said heating element having first and second halves; and
   first and second resistance wires at the heating element, wherein the first resistance wire extends along a portion of the first half of the heating element and the second resistance wire extends along a portion of the second half of the heating element.

29. A grill for cooking food as set forth in claim 27, wherein the offset heating structure includes:
   first and second heating elements in the roller;
   a first resistance wire extending along a portion of the first heating element; and
   a second resistance wire extending along a portion of the second heating element, wherein the first resistance wire is positioned on the opposite side of the roller from the second resistance wire.

30. A method of controlling the temperature of a roller grill having a plurality of rollers, including the steps of:
   setting a set temperature for the grill;
   communicating said set temperature to a control device;
   adjusting heating elements in the rollers to the set temperature;
   measuring the temperature of the grill with at least one temperature sensor;
   communicating the measured temperature to the control device;
   comparing the measured temperature with the set temperature in the control device; and
   adjusting the heating elements to minimize variation of the measured temperature from the set temperature without involvement of an operator.

31. A method of controlling the temperature of a roller grill as set forth in claim 30, further including the step of selectively displaying the set temperature and the measured temperature on a multi-function temperature display.

32. A method of controlling the temperature of a roller grill as set forth in claim 30, further including the steps of:
   providing at least one roller with first and second heating elements, with each heating element having a resistance wire along only a portion of its length, said first and second heating elements being oriented so that the resistance wire of the first heating element is positioned on the opposite side of the roller from the resistance wire of the second heating element; and selectively offsetting the temperature of one side of the roller relative to the other side of the roller.

33. A method of controlling the temperature of a roller grill as set forth in claim 30, further including the steps of:

providing at least one roller with a heating element having first and second halves and first and second resistance wires, said first resistance wire extending along a portion of the first half of the heating element and the second resistance wire extending along a portion of the second half of the heating element, thereby allowing the temperature to be offset between the two sides of the roller; and selectively offsetting the temperature of one side of the roller relative to the other side of the roller.

34. A method of controlling the temperature of a roller grill as set forth in claim 30, further including the step of functionally separating the grill into front and back sections with the front section having heating elements controlled independently of the heating elements for the back section and wherein the step of measuring the temperature of the grill includes measuring the temperature of the front section with a first temperature sensor and measuring the temperature of the back section with a second temperature sensor.

35. A method of controlling the temperature of a roller grill as set forth in claim 30, further including the steps of:

selecting a temperature calibration factor; and adjusting the measured temperature based on the temperature calibration factor prior to comparing the measured temperature with the set temperature.

* * * * *